(No Model.)
J. A. MYERS.
SCISSORS FOR SPLICING PURPOSES.
No. 551,555. Patented Dec. 17, 1895.
Fig. 1,
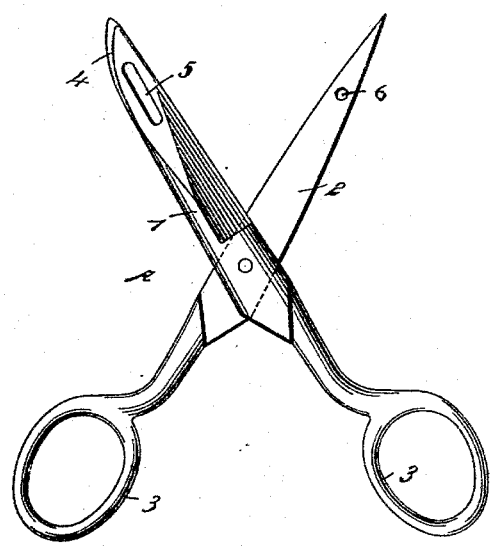
Fig. 2,      Fig. 3,
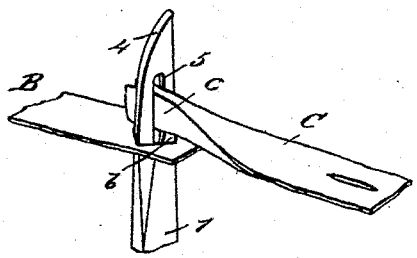 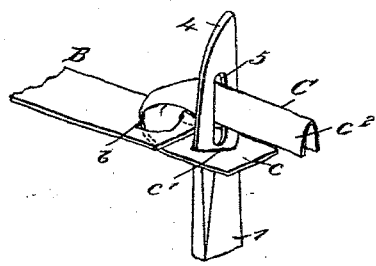
Fig. 4.
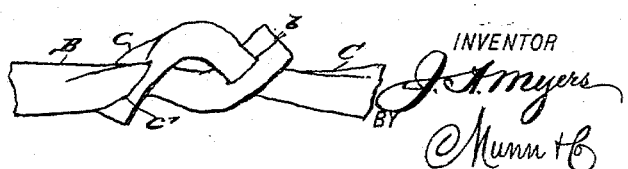
WITNESSES:     INVENTOR
Edward Thorpe.     J. A. Myers
    BY Munn & Co
    ATTORNEYS.
ANDREW B.GRAHAM. PHOTO-LITHO.WASHINGTON,D.C.

UNITED STATES PATENT OFFICE.

JOHN A. MYERS, OF MONROE CITY, INDIANA, ASSIGNOR OF ONE-HALF TO EDWARD P. BLAUN, OF SAME PLACE.

SCISSORS FOR SPLICING PURPOSES.

SPECIFICATION forming part of Letters Patent No. 551,555, dated December 17, 1895.

Application filed February 28, 1895. Serial No. 540,053. (No model.)

*To all whom it may concern:*

Be it known that I, JOHN A. MYERS, of Monroe City, in the county of Knox and State of Indiana, have invented certain new and useful Improvements in Scissors for Splicing Purposes, of which the following is a full, clear, and exact description.

This invention relates to certain improvements in combination-tools, and it has for its object to provide a tool in the form of a pair of scissors which shall be adapted for various household uses—such, for example, as splicing strips or cords—all as will be hereinafter fully set forth.

The novel features of the invention will be carefully defined in the claim.

In the accompanying drawings, illustrating the invention, Figure 1 is a plan view of the tool. Figs. 2 and 3 are detached perspective views showing the employment of the tool for splicing strips, and Fig. 4 is a view representing the ends of two strips of material spliced together in a different way by the aid of the tool.

Like figures and letters of reference designate corresponding parts in the several views.

In the drawings, A represents the tool, which is in the form of an ordinary pair of scissors or shears, provided with blades 1 and 2 having handles 3, said blades being pivoted together and provided on their adjacent faces with cutting or knife edges in the usual way. Opposite the main shearing-edge of the blade 1 an additional cutting-edge 4 is produced extending a suitable distance from the point of said blade, thereby adapting the end of the blade 1 to freely penetrate and cut a slit in material operated on with the implement, and in the blade 1, near the point thereof, is formed a perforation 5, serving to receive the end of a strip to be spliced.

In using the tool for splicing strips—such, for example, as cloth strips for carpet-rags— the blade 1 of the shears is passed through one end of the strip B, forming a perforation $b$, (seen in Fig. 2,) and the strip B is pressed down upon the blade until the perforation 5 in said blade lies above the strip, whereupon the end $c$ of a second strip C is folded and passed through the perforation 5, as clearly seen in Fig. 2, after which the blade 1 is withdrawn from the perforation $b$, carrying with it the end $c$ of the strip C, as will be readily understood. The blade 1 is then passed through the end $c$ of the strip C, forming a perforation $c'$, and the opposite end $c^2$ of the strip C is then passed through the perforation 5 in the blade 1, as seen in Fig. 3, after which the blade 1 is again withdrawn through the perforation $c'$, carrying the body of the strip C through said perforation, so as to form a splice. The blade 2 of the shears is likewise provided with a perforation 6 of circular form, which may be employed for splicing cords in a manner similar to that above described. In this construction the perforations 6 and 5 are made to correspond with one another when the shears are closed, so that the shears may be used for splicing purposes when closed.

In Fig. 4 I have shown the ends of two strips spliced together in a slightly-different manner from that above described with reference to Figs. 2 and 3. In this view, instead of carrying the end $c^2$ of the strip C through the perforation $c'$ at the opposite end of said strip, the end of the strip B opposite to the perforation $b$ is carried through the perforation $c'$.

The tool, as above described, may be employed for other purposes—such, for example, as cutting buttonholes, &c.—and it is obvious that some modification may be made therein without material departure from the principle of the invention.

Having thus described my invention, I claim as new and desire to secure by Letters Patent—

A pair of scissors having each blade provided with a cutting edge and a perforation, the perforations in the respective blades being arranged to register with and lie over one another when the scissors are closed, substantially as described.

JOHN A. MYERS.

Witnesses:
WILLIAM R. WHEELER,
WILLIAM ALTON.